(12) United States Patent
Smith (10) Patent No.: US 7,865,155 B1
(45) Date of Patent: Jan. 4, 2011

(54) WIRELESS COMMUNICATION SYSTEM WITH SIGNAL SELECTION AND COMBINATION

(75) Inventor: Malcolm M. Smith, Calvary (CA)

(73) Assignee: Cisco Technology, Inc., San Jose, CA (US)

( * ) Notice: Subject to any disclaimer, the term of this patent is extended or adjusted under 35 U.S.C. 154(b) by 1192 days.

(21) Appl. No.: 10/033,572

(22) Filed: Nov. 2, 2001

(51) Int. Cl.
*H04B 17/02* (2006.01)

(52) U.S. Cl. ..................... 455/137

(58) Field of Classification Search ......... 455/132–135, 455/137, 272, 273, 59, 101
See application file for complete search history.

(56) References Cited

U.S. PATENT DOCUMENTS

| | | | |
|---|---|---|---|
| 5,068,916 A | | 11/1991 | Harrison et al. |
| 5,179,559 A | | 1/1993 | Crisler et al. |
| 5,293,643 A | | 3/1994 | Israelsson |
| 6,026,115 A | * | 2/2000 | Higashi et al. ............... 375/148 |
| 6,041,235 A | | 3/2000 | Aalto |
| 6,167,243 A | * | 12/2000 | Wang et al. .................. 455/137 |
| 6,219,550 B1 | * | 4/2001 | Kanerva et al. ............. 455/436 |
| 6,320,852 B1 | * | 11/2001 | Obuchi et al. ............... 370/328 |
| 6,493,554 B1 | | 12/2002 | Kanerva et al. |
| 6,728,919 B1 | * | 4/2004 | Kondo et al. ................ 714/751 |

* cited by examiner

*Primary Examiner*—Alexander Jamal
(74) *Attorney, Agent, or Firm*—Baker Botts L.L.P.

(57) ABSTRACT

Portion-by-portion selection and/or combination of signals received from multiple base transceiver stations (BTSs) is used to improve the quality of reception in cellular communication systems. For any particular frame, bit, symbol, or chip, the highest-quality copy can be selected and concatenated onto the end of a sequence of data being generated by the system. In addition, the energies and/or voltages of multiple copies of bits or symbols received by multiple BTSs can be added and/or averaged in order to improve signal quality (e.g., increased signal-to-noise ratio (SNR) and/or signal-to-interference ratio (SIR)). In addition, a single communication system can utilize both selection and combination procedures. The resulting communication system reduces error rate and improves the quality of reception.

18 Claims, 7 Drawing Sheets

FIG. 16

WIRELESS COMMUNICATION SYSTEM WITH SIGNAL SELECTION AND COMBINATION

TECHNICAL FIELD OF THE INVENTION

The present invention relates in general to wireless communication technology and more particularly to a wireless communication system with signal selection and combination.

BACKGROUND OF THE INVENTION

Figure 1:
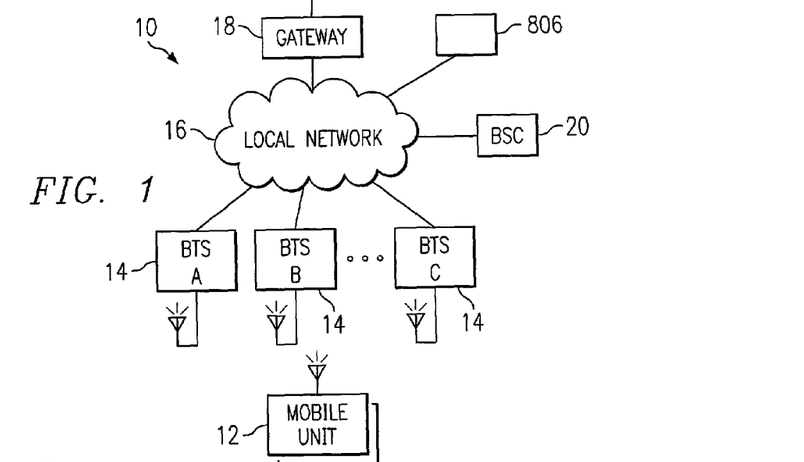
FIG. 1 is a block diagram of a cellular communication system.

Typical cellular communication systems include base transceiver stations (BTSs) that engage in wireless communication with mobile devices such as cellular phones. An example of such a system is illustrated in FIG. 1. The BTSs 14 of the illustrated system connect to at least one base station controller (BSC) 20 through a local network 16, and transmit and receive phone calls and other data using circuit-switched, time division multiplexed communications protocols, virtual circuit, asynchronous transfer mode (ATM) protocols, and/or other communications protocols. The term "local network" as used herein refers to a network served by a particular BSC 20. The local network 16 is typically an Internet protocol (IP) network, and can generally be considered part of a wider communication network having other portions which can include, for example, other local cellular networks and/or other types of networks such as the Internet. The other network portions can be referred to, with respect to the local network 16, as "outside" network portions. The local network 16 communicates to the outside network portions through a gateway 18.

Figure 2:
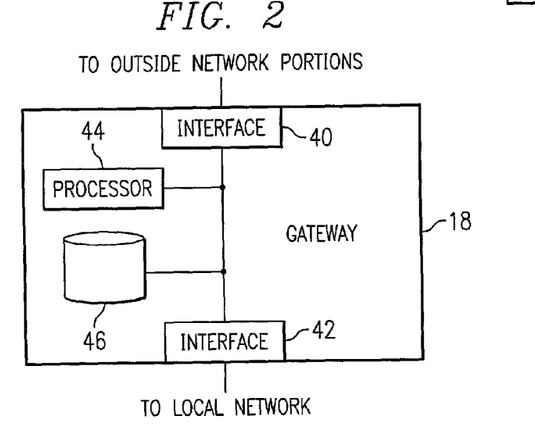
FIG. 2 is a block diagram of a gateway apparatus for use in the communication system of FIG. 1.

FIG. 2 illustrates an example of a gateway 18 for use in the cellular communication system of FIG. 1. The gateway 18 includes an interface 40 for communicating with outside network portions, an interface 42 for communicating with the local network 16, a processor 44, and a data storage device 46 which stores information for use by the other components of the gateway 18. The stored information can include, for example, programs for execution by the processor 44.

A mobile device—a/k/a a "mobile unit" (MU) 12—engages in direct wireless communication with one or more of the BTSs 14 in order to ultimately communicate with another end-user device such as another MU or a hard-wired telephone (a/k/a a "land line"). The other end-user device can be within the geographic region served by the local network or can be elsewhere in the wider network—e.g., in an outside network portion.

A typical cellular network—which can include one or more local networks—covers a contiguous area that is divided into multiple cells. Each cell is served by a BTS 14 which provides a wireless link for at least one MU (e.g., a cellular phone) within the cell. The wireless link—which in many systems operates within the radio-frequency (RF) spectrum—is used to transmit electromagnetic data signals representing data being sent between the MU 12 and the BTS 14.

Consider an MU 12 which is engaged in a communication session (e.g., a telephone call). As the MU 12 moves among the cells, the session (i.e., the call) is handed off among the BTSs 14 in order to provide continuous coverage.

Typically, a BSC 20 controls call set-up within the BTSs 14, and inter-cell operations such as handoffs among the BTSs 14. In addition, the BSC 20 in conventional systems generally collects information about the respective BTSs 14 and controls the wireless communication parameters of the BTSs 14, such as transmission strength and modulation parameters. During call handoff, a local handoff controller 806 is used to control the allocation of resources among the other devices—e.g., the BSC 20 and the BTSs 14—which are connected to the local network 16.

For "uplink" communications—i.e., communications sent from a cellular phone or other MU 12—it is common to utilize multiple BTSs 14 to receive data from the MU 12. In conventional systems, the best-quality data signals from one or more of the BTSs 14 are selected by the BSC 20 in order to improve the quality of reception, as is well-known in the art. Typically, the stream of data transmitted from the MU 12 is broken into "frames" (i.e., portions of selected size).

For "downlink" communications—i.e., communications sent from one or more BTSs 14 to the MU 12—multiple BTSs 14 can send signals to a single MU 12 in order to improve the quality of reception, as is well-known in the art.

The above-described functions of: (1) selecting uplink signals received by multiple BTSs 14, and (2) distributing downlink signals through multiple BTSs 14 to a single MU 12, are typically performed by a software and/or hardware system called a "selection and distribution unit" (SDU). The SDU controls various characteristics of the digital transmission of the data to and from each MU. Such characteristics typically include parameters such as frame size and allocation of digital capacity such as bit transmission and processing capacity. In conventional systems, the SDU function is performed by the BSC 20. In addition, the allocation of wireless resources (e.g., wireless bandwidth) to an MU is also performed by the BSC 20. In particular, the BSC 20 also includes a wireless resource allocation function which assigns wireless bandwidth, spreading codes (e.g., Walsh codes), and/or time slots to the respective MUs connected to the local network 16. Moreover, digital transmission parameters such as digital capacity allocation are related to the quantity of wireless resources being used. For example, the digital capacity and the wireless capacity allocated to a particular MU must together increase with increasing data transmission rate. The BSC typically coordinates the SDU function and the wireless resource allocation function such that the allocation of wireless resources matches the allocation of digital resources.

The system of the claimed invention improves the capacity and/or coverage of a wireless communication system (e.g., Code Division Multiple Access (CDMA), Time Division Multiple Access (TDMA), or Wideband Code Division Multiple Access (W-CDMA)) by reducing the required transmit power of the MU in simultaneous communications with multiple BSTs.

SUMMARY OF THE INVENTION

From the foregoing, it may be appreciated by those skilled in the art that a need has arisen for a communications system which can effectively utilize portions of signals from multiple BTSs, to thereby improve reception of signals from an MU.

It is therefore an object of the present invention to provide a communications system which can combine portions of signals from multiple BTSs to thereby construct an improved signal.

It is a further object of the present invention to provide a communication system which can select portions of signals from multiple BTSs to thereby construct an improved signal.

These and other objects are accomplished by a communication system comprising a first base transceiver station receiving from a mobile unit a first wireless signal, wherein the signal is comprised of a first signal portion having a first signal characteristic and a second signal portion. The system is further comprised of a second base transceiver station receiving from the mobile unit a second wireless signal, wherein the second wireless signal is comprised of a third signal portion having a second signal characteristic and a fourth signal portion. A fifth signal portion is generated by applying a processing operation to the first and third signal portions, independently from the second and fourth signal portions, wherein the processing operation comprises using the first and second signal characteristics to perform at least one of the steps of selecting one of the first and third signal portions and combining the first and third signal portions.

BRIEF DESCRIPTION OF THE DRAWINGS

For a more complete understanding of the present invention, reference is now made to the following description taken in conjunction with the accompanying drawings, wherein like reference numbers represent like parts, in which.

DETAILED DESCRIPTION OF THE INVENTION

Figure 7:
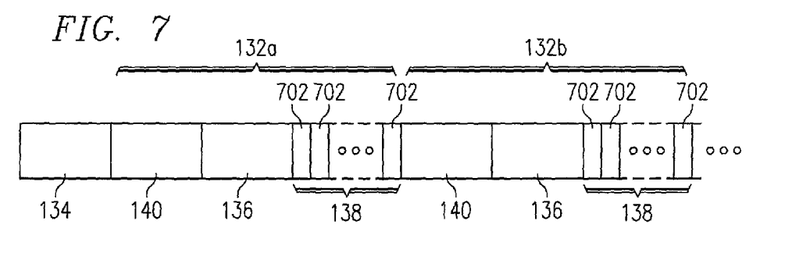
FIG. 7 is a block diagram of a data stream in accordance with the present invention.

In accordance with the present invention, data received through multiple BTSs can be combined and/or selected on a frame-by-frame basis. FIG. 7 illustrates an exemplary wireless data stream divided into frames in accordance with the present invention. The frames are transmitted from one BTS 14 to another BTS 14 or from one BTS 14 to the BSC 20 across the local network 16. The data stream includes a routing label 134, a first wireless frame 132a, a second wireless frame 132b, and any number of additional frames as may be required to carry information during a communication session between a MU and the BTSs. The routing label 134 provides information which can be used to direct the frame to its ultimate destination. Each of the wireless frames 132a and 132b includes a synchronization bias field 140 which enables synchronization of different copies of the same wireless frame arriving through different routes (i.e., through different BTSs). Each wireless frame also includes a wireless frame header 136 which provides information about the type of data being transmitted within the frame. In addition, each of the wireless frames 132a and 132b includes a data payload 138 comprising one or more data bits 702.

Figure 10:
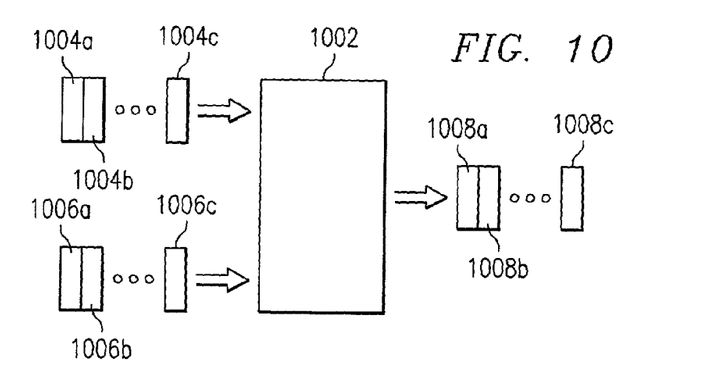
FIG. 10 is a block diagram of additional data streams being processed in accordance with the present invention.

A wireless signal broadcast by an MU 12 can be received in the form of multiple copies, each copy being received by one of the BTSs 14. Because the quality of reception can vary among the BTSs 14, it is advantageous to employ a procedure which: (a) selects the copy or copies, or portions thereof, having the best quality; or (b) combines the copies, or portions thereof, to thereby obtain a signal having improved quality. FIG. 10 is a block diagram illustrating an example of such a procedure for generating improved quality data in accordance with the present invention. A first set of signal portions 1004a, 1004b, and 1004c is received by a first BTS. A second set of signal portions 1006a, 1006b, and 1006c is received by a second BTS. Signal portions 1004a and 1006a are processed using a signal processing algorithm 1002 which either selects the best one of signal portions 1004a and 1006a, or combines signal portions 1004a and 1006a, to generate an improved quality output signal 1008a. Similarly, signal portions 1004b and 1006b are processed using the algorithm 1002 to produce an additional improved quality signal portion 1008b. Signal portions 1004c and 1006c are also processed using the signal processing algorithm 1002 to obtain yet another improved quality signal portion 1008c. In fact, any number of pairs of signal portions can be similarly processed.

In accordance with the present invention, the processing can be done on a frame-by-frame basis—i.e., the signal portions 1004a-1004c, 1006a-1006c, and 1007a-1008c can be frames. For example, the best copy of each frame can be selected, and the selected copies can be concatenated to form a more accurate version of the sequence of data frames transmitted by the MU 12. Alternatively, or in addition, each copy of a frame can be combined to form a better quality output frame, and the set of output frames can be concatenated to form a better quality frame sequence.

Various types of signal quality parameters and/or characteristics can be utilized as indicators of signal quality. For example, there is a signal-to-noise ratio (SNR) and/or a signal-to-interference ratio (SIR) associated with each bit received by a BTS. High signal quality is generally associated with high SNR and/or high SIR. The mean (e.g., the arithmetic mean) of the respective SNRs or SIRs of a bit 702 within the payload 138 of a frame can be utilized as an indicator of the quality of reception of the frame, and based upon this criterion, the best frame can be selected from among the corresponding copies received by the respective BTSs 14.

Other criteria can also be used to select a preferred frame from among the copies received by the various BTSs 14. For example, an algorithm in accordance with the present invention can select the frame with the highest energy-per-bit (Eb), the lowest error-per-bit, or can select only those frames which pass an error-detection procedure such as, for example, the well-known Cyclic Redundancy Check (CRC).

In accordance with an additional aspect of the present invention, data from the various BTSs 14 can be selected on a bit-by-bit basis. In other words, the respective copies of each bit which are received by the respective BTSs 14 can be compared based upon SNR, SIR, energy, Eb, CRC, or another criterion indicating the quality of reception. The bit or bits having the best quality can be selected.

Figure 8:
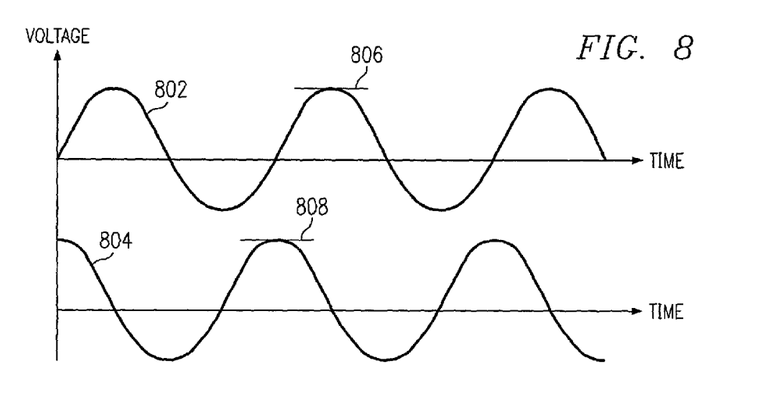
FIG. 8 is a graph of signal portions which are received by a system in accordance with the present invention.

Each bit broadcast by the MU 12 is typically represented by a pair of analog "symbols" which are sinusoidal analog signals. Such signals are illustrated in FIG. 8. Whether a bit is a "logic 1" or a "logic 0" is determined by the relative phases of the symbols 802 and 804. If a bit is considered a "portion" of a signal, a symbol can be considered a portion of the bit, or a "sub-portion" of the signal. Similarly to bits, associated with each symbol is an SNR, an SIR, an energy, and/or a voltage. An algorithm in accordance with the present invention can select the "best" copy of a symbol broadcast by the MU 12, based upon which symbol has the highest SNR, the highest SIR, the highest energy, or the highest voltage. Each selected copy of symbol 802 can then be paired with a selected copy of the corresponding symbol 804 to form a bit having a low probability of error. The resulting bits can then be concatenated into a sequence which is delivered to the ultimate destination of the data.

Figure 9:
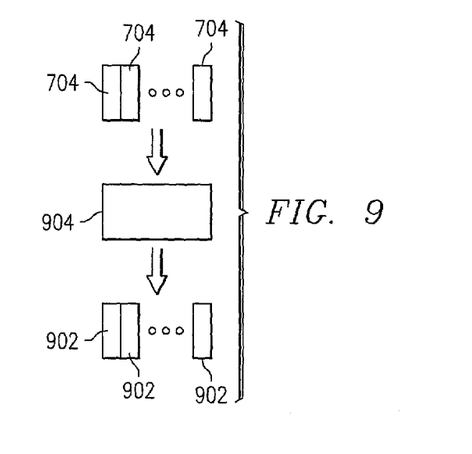
FIG. 9 is a block diagram of a data stream being processed in accordance with the present invention.

As illustrated in FIG. 9, for applications requiring a heightened level of security, a group of bits 704 can be processed by a mathematical spreading process 904 to form "chips" 902 as is well-known in the art. An algorithm in accordance with the present invention can perform the above-described selection process on a chip-by-chip basis, similarly to the frame-frame procedure discussed above.

Figure 6:
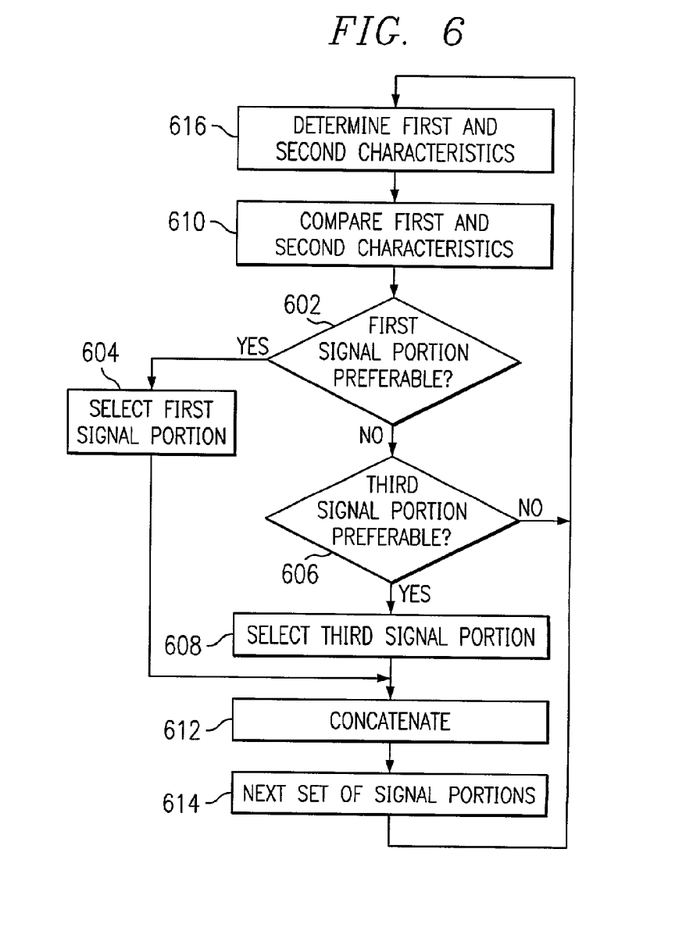
FIG. 6 is a flow diagram of an algorithm for selecting a portion of a wireless signal in accordance with the present invention.

FIG. 6 illustrates an example of a data selection algorithm in accordance with the present invention. The algorithm can optionally be used to perform frame-by-frame, bit-by-bit, symbol-by-symbol, or chip-by-chip selection of portions of data streams. In the algorithm illustrated in FIG. 6, signals received by two BTSs are processed. However, such an algorithm can be used to process signals from any number of BTSs.

In the illustrated example, a signal having first and second signal portions is received through a first BTS, and a signal having third and fourth signal portions is received through a second BTS. The first and third signal portions can, for example, be derived from an earlier portion of a signal stream transmitted by an MU, and the second and fourth signal portions can be derived from a subsequent portion of the data stream transmitted by the MU. The algorithm first determines a first signal characteristic of the first signal portion, and a second signal characteristic of the third signal portion (step 616). As discussed above, a portion of a signal can be a frame, a bit, a symbol, a chip, or any other portion of a signal received through a BTS. As also discussed above, the signal characteristic of each of the portions can be an SNR, an SIR, an energy, a voltage, an Eb, the result of an error detection test such as a CRC, or any other parameter which can serve as an indication of signal quality. Preferably, an SNR or an SIR is used.

The first and second signal characteristics are compared (step 610). If, based upon the comparison of the first and second signal characteristics, the first signal portion received from the first BTS is preferable (i.e., is of better quality) (step 602), the first signal portion is selected (step 604). On the other hand, if the comparison of the first and second signal characteristics indicates that the third signal portion received from the second BTS is preferable (step 606), the third signal portion is selected (step 608). The selected portion is then concatenated onto any previously-received data in the data stream (step 612), and the algorithm is repeated for the next portion of the signal stream being transmitted by the MU 12 (step 614). For example, the algorithm can next process the second and fourth signal portions.

Figure 11:
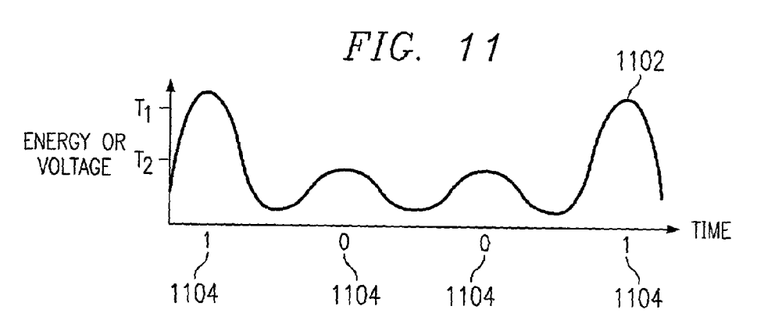
FIG. 11 is a graph of signal portions, representing digital bits, which are received by a system in accordance with the present invention.

In accordance with another aspect of the present invention, signals received by multiple BTSs can be combined on a bit-by-bit or symbol-by-symbol basis by adding and/or averaging the energy and/or voltage associated with each copy of a bit or symbol received through a set of BTSs. For example, when the RF signal received by a BTS is converted into a digital data stream, there is an energy and/or voltage associated with each bit, as is illustrated in FIG. 11. The RF signal is converted to an analog waveform 1102 which represents a sequence of bits 1104. One or more thresholds $T_1$ and $T_2$ are used to determine whether a particular portion of the waveform 1102 represents a 0 or a 1. For example, if the energy or voltage of a portion of the waveform exceeds $T_1$, the corresponding bit is a 1. On the other hand, if the energy or voltage of the portion of the waveform is less than $T_2$, then the portion of the waveform represents a 0. However, due to noise, interference, and/or other potential sources of error, there is associated with each bit a probability that the bit is represented incorrectly. In accordance with the present invention, the probability of an incorrect bit can be reduced by adding and/or averaging the waveforms from multiple BTSs.

Figure 12:
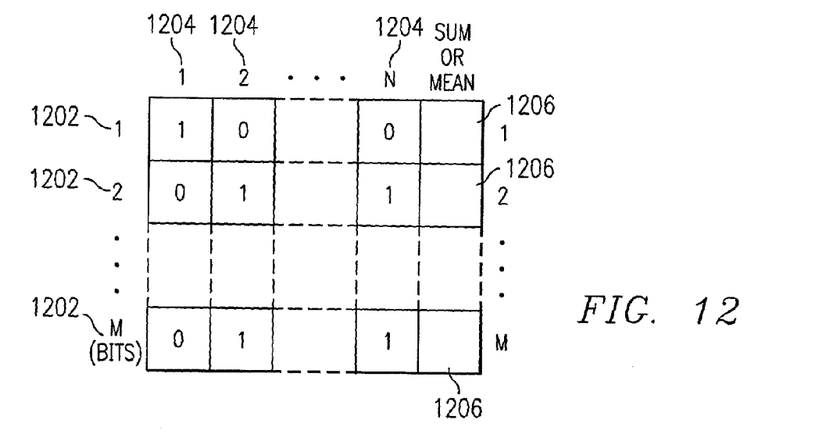
FIG. 12 is a chart illustrating a combination of signal portions in accordance with the present invention.

The addition or averaging of bits received via multiple signal paths (i.e., through multiple BTSs) can be further understood with reference to FIG. 12. In the example illustrated in FIG. 12, M bits 1202 are being received through N signal paths 1204 (i.e., through N separate BTSs). For each of the bits 1202, the N copies of the bits are added or averaged to form a sum or mean 1206. The M sums or means are then ready to be transported to the recipient of the data.

Figure 13:
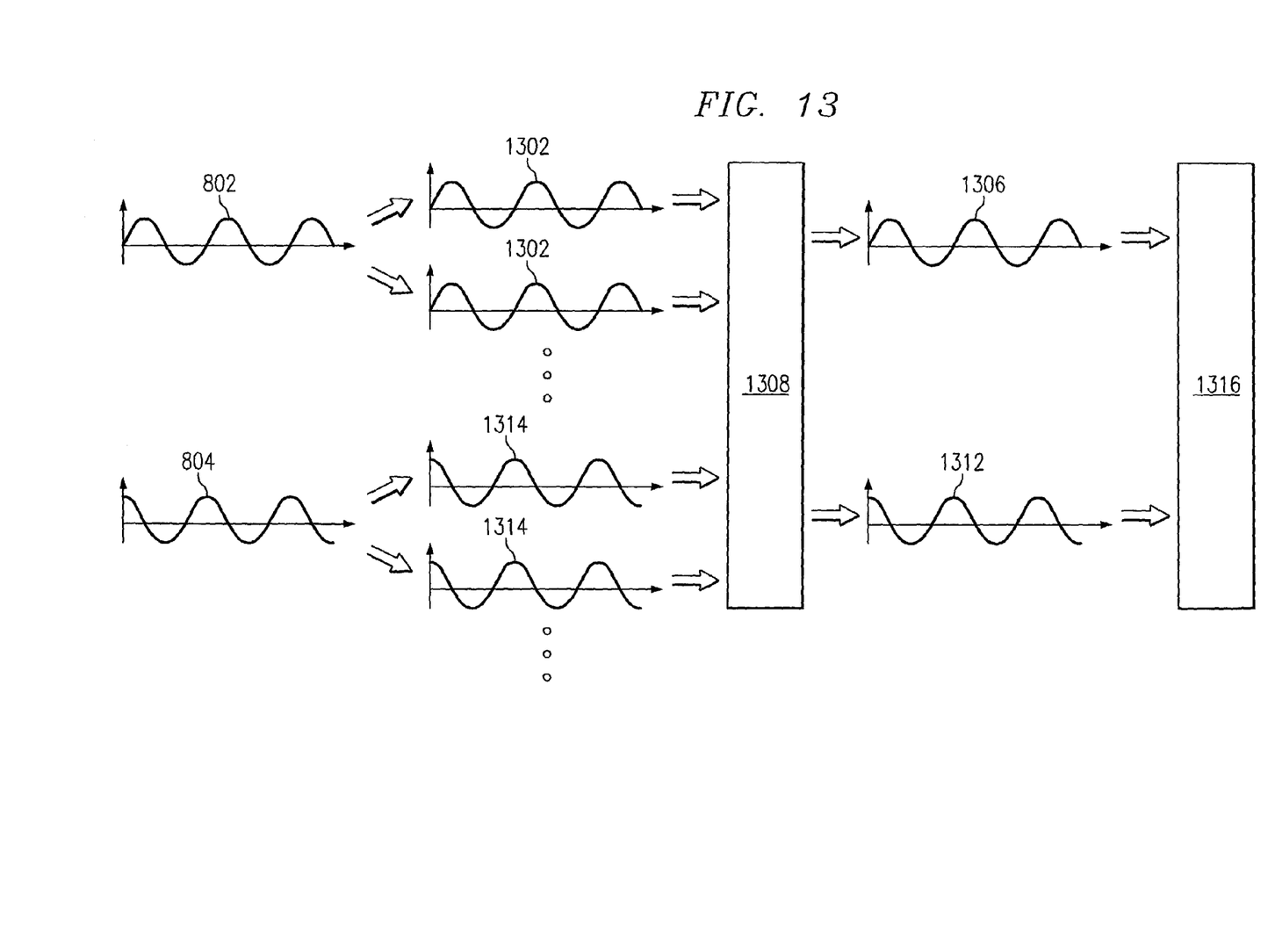
FIG. 13 is a block diagram illustrating processing of signal portions in accordance with the present invention.

A similar procedure, illustrated by the block diagram of FIG. 13, can be used to add or average the voltages of multiple copies of symbols received by the BTSs 14. For example, as illustrated in FIG. 8, each symbol is represented by a waveform (802 or 804). If multiple BTSs 14 are being used to receive a first symbol waveform 802 transmitted by the MU 12, multiple copies 1302 of the waveform 802 are available, and these copies 1302 of the waveform 802 can be added or averaged (block 1308) to form a resulting waveform 1306 which is likely to have a higher SNR and/or SIR than the constituent waveforms 1302. Similarly, the corresponding symbol waveform 804 is also received, by multiple BTSs, as multiple copies 1314. The copies 1314 are added or averaged to form a resulting waveform 1312 having improved SNR and/or SIR. Waveforms 1306 and 1312 form a pair of symbols which are then used to form a bit 1316 with a reduced probability of error.

Figure 14:
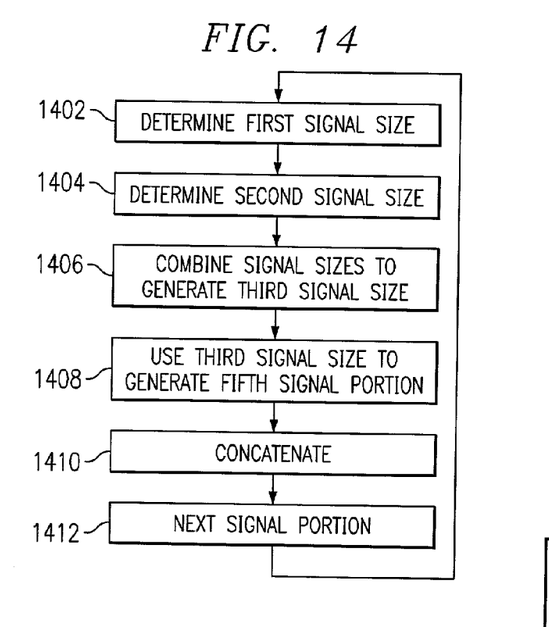
FIG. 14 is a flow diagram illustrating an exemplary procedure for processing signal portions in accordance with the present invention.

FIG. 14 illustrates an example of an algorithm for combining signal sizes of multiple signal portions in accordance with the present invention. In the exemplary algorithm of FIG. 14, signal portions from only two BTSs are combined. However, such an algorithm can be used to combine signal portions from any number of BTSs. In the algorithm illustrated in FIG. 14, a signal received from a first BTS has two portions—referred to as first and second signal portions—and a signal received by a second BTS also has two signal portions—referred to as third and fourth signal portions. Each signal portion preferably is, or represents, a data bit. A first signal size associated with the first signal portion is determined (step 1402). A second signal size associated with the third signal portion is also determined (step 1404). The first and second signal sizes are combined to thereby generate a third signal size (step 1406). Because a data bit associated with a signal portion is typically represented by the size of the signal portion, the third signal size can be used to generate a fifth signal portion (step 1408). For example, if the respective sizes of the first and third signal portions represent data bits, and the third signal size is the sum or mean of voltages associated with the first and third signal portions, then the third signal size itself represents a data bit associated with the fifth signal portion.

Once the fifth signal portion is determined, this portion is concatenated onto the last portion of any prior data in the sequence being constructed (step 1410). The algorithm then proceeds to the next portion of the signal transmitted by the MU 12 (step 1412). For example, the algorithm can next process the second and fourth signal portions. The above-described procedure can be repeated any number of times, depending upon how many signals portions are being transmitted during a communications session.

Figure 15:
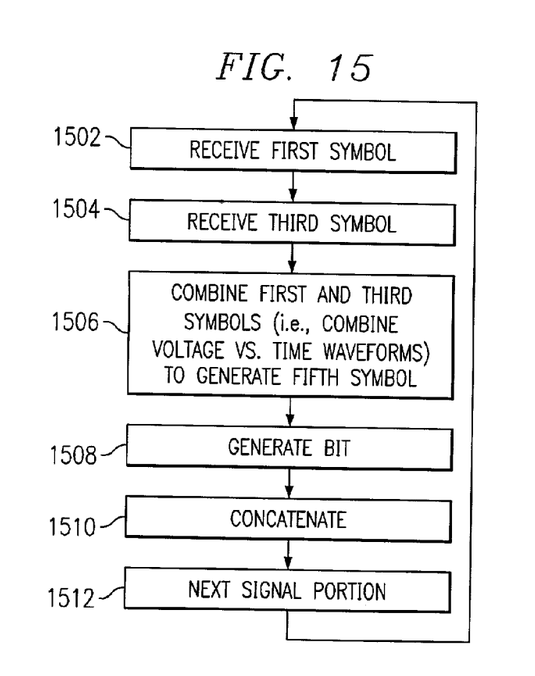
FIG. 15 is a flow diagram illustrating an additional exemplary procedure for processing signal portions in accordance with the present invention.

FIG. 15 illustrates an example of an algorithm that can be used to combine symbols in accordance with the invention. In the algorithm illustrated in FIG. 15, symbol copies are received through two BTSs. However, the algorithm can be applied to symbol copies received through any number of BTSs. The signal received by the first BTS comprises first and second signal portions—in this case, first and second symbols. The signal received by the second BTS comprises third and fourth signal portions—in this case third and fourth symbols. After the first and third symbols are received (steps 1502 and 1504), the symbols are combined by adding and/or averaging the time-varying voltages of the waveforms representing the first and third symbols, thereby generating a fifth symbol (step 1506). In other words, the size of the changing voltage of each waveform is added to thereby generate a time-varying voltage which represents the fifth symbol. Preferably, the addition of the waveforms of the first and third symbols is performed using an analog voltage adder; such adders are well-known in the art. The fifth symbol is then paired with a set of symbols representing the same bit to thereby generate a data bit (step 1508). The data bit generated in step 1508 is concatenated onto the sequence of any previously-generated data bits (step 1510), and the procedure repeats itself for the next signal portion (i.e., the next symbol) (step 1512). For example, the algorithm can next process the second and fourth signal portions—i.e., the second and fourth symbols.

In accordance with the present invention, either the BSC or a BTS can be used to perform the SDU function. If the SDU function is to be performed at the BTS level, a particular BTS is generally selected to perform this function. The selected BTS can be referred to as the "primary" BTS (item 378 of the system illustrated in FIG. 4). The other BTSs 382 can be referred to as "secondary" BTSs. Because there are generally no high-capacity links directly connecting the various BTSs, the data sent to and from the MU 12 typically travels to and from the primary BTS 378 through the local network 16 which performs the necessary communication with the secondary BTSs 382. Specifically, wireless uplink data signals 502 are sent from the MU 12, via wireless links 412, to the secondary BTSs 382 which convert the wireless data signals 502 into digital data signals 510 representing the data being communicated. The digital data signals 510 are sent into the IP network 16 through high-capacity (typically "T1") communication lines 404 capable of quickly transmitting large quantities of data. The data are then sent—in the form of digital data signals 516—from the IP network 16 through an additional high-capacity communication line 406 to the primary BTS 378. The primary BTS 378 also receives its own copies of the wireless data signals 502 directly, through a wireless link 414, from the MU 12. In accordance with the present invention, the SDU function includes selection of digital data signals corresponding to the best quality wireless data signal or signals received by the primary BTS 378 and the secondary BTSs 382. As discussed above, the selection need not be based solely upon which signals, considered in their entirety, have the best quality. The selection can also be based which portions (e.g., frames) of the wireless signals have the best quality. The selection procedure is preferably performed on a frame-by-frame basis. Preferably, the SDU function includes combination of digital data signals corresponding to two or more of the wireless data signals 502 received by the primary BTS 378 and the secondary BTSs 382. The combination procedure preferably includes adding and/or averaging of the respective amplitudes and/or power levels of the wireless data signals 502, and is preferably performed on a frame-by-frame basis.

Figure 4:
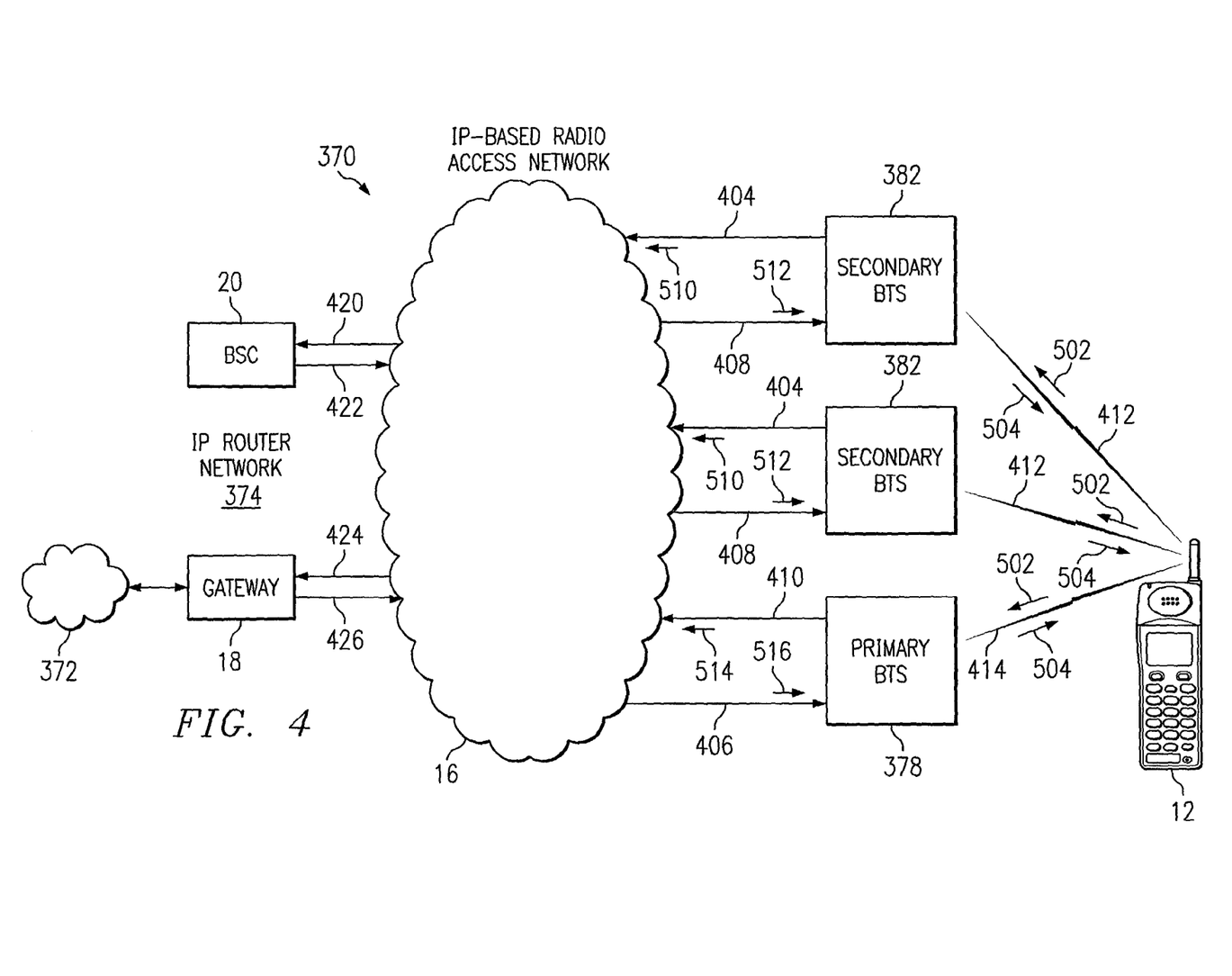
FIG. 4 is a block diagram of an additional cellular communication system.

The primary BTS 378 uses a high-capacity line 410 to communicate the selected or combined data—in the form of digital data signals 514—back into the IP network 16, from which they are transmitted, through an additional high-capacity line 424, to a gateway 18. The gateway 18 is connected to an outside network portion 372. The outside network portion 372 delivers the data to their ultimate destination.

In the downlink direction, data are received, from the outside network portion 372, into the gateway 18 and are transmitted, through a high-capacity line 426, into the IP network 16. The data are then transmitted, in the form of digital data signals 516, from the IP network 16, through high-capacity line 406, to the primary BTS 378. The primary BTS 378 distributes the downlink data to the various secondary BTSs 382 by sending the data—in the form of digital data signals 514—through high-capacity line 410 into the IP network 16, from which the data are distributed—in the form of digital data signals 512—to the secondary BTSs 382 through additional high-capacity lines 408. The secondary BTSs 382 then communicate the data in the form of wireless data signals 504 to the MU 12 using wireless transmission—i.e., through wireless paths 412. In addition, the primary BTS 378 sends data signals 504 directly to the MU 12 through wireless link 414.

A communication system in accordance with the present invention can, for example, perform wireless communication within the widely used 800 MHz cellular band, the widely used 1.9 GHz PCS band, or the 2.4 GHz band which is currently unlicensed. However, the present invention can be used for wireless communication at any frequency over any wireless link, and the discussion herein is not meant to imply any limitation of the frequency range and/or electromagnetic spectrum within which the invention can be practiced.

Figure 3:
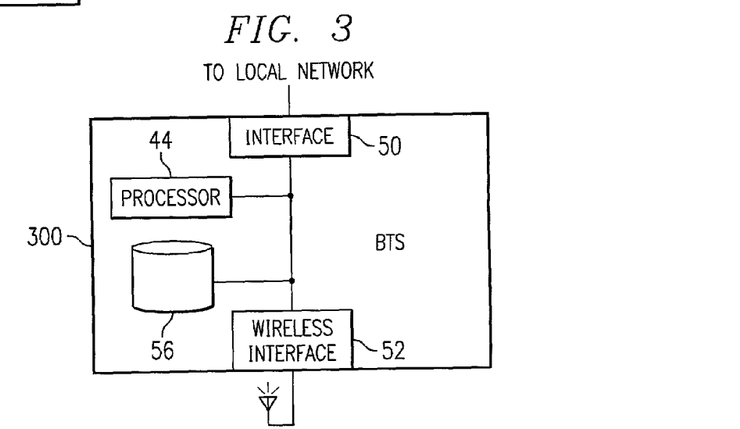
FIG. 3 is a block diagram of a BTS for use in the communication system of FIG. 1.

FIG. 3 illustrates an example of a BTS for use in a cellular communication system in accordance with the invention. The BTS 300 includes an interface 50, a wireless interface 52, a processor 44, and a data storage device 56. The interface 50 couples the BTS 300 to the local network 16, and the wireless interface 52—which can be, e.g., an RF modem—couples the BTS 300 to one or more mobile units such as the mobile unit 12 illustrated in FIGS. 1 and 4. The data storage device 56 stores information for use by the other components of the BTS 300. Such information can include computer code for execution by the processor 44, and can also include information associating one or more MUs with multicast groups, time-slot assignments, frequency assignments, spreading code assignments, and/or other suitable information. The processor 44 manages and controls the operation of the various elements within the BTS 300.

Figure 16:
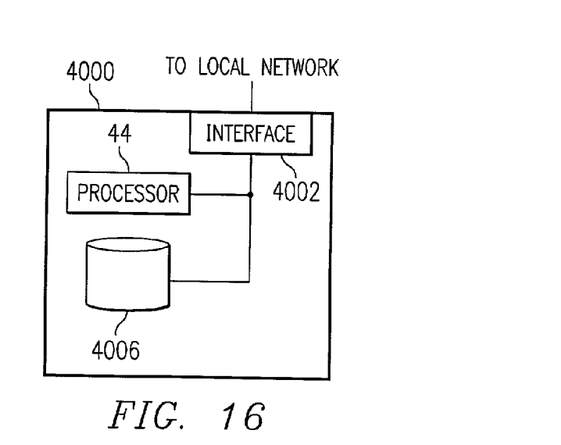
FIG. 16 is a block diagram illustrating an exemplary controller for use in a cellular communication system in accordance with the present invention.

FIG. 16 illustrates an example of a controller 4000 for use in a cellular communication system in accordance with the present invention. The controller 4000 illustrated in FIG. 16 can be, for example, a BSC 20 as illustrated in FIGS. 1 and 4. The controller 4000 includes an interface 4002, a processor 44, and a data storage device 4006. The interface 4002 connects the controller 4000 to the local network 16. The data storage device 4006 stores information for use by the other elements of the controller 4000. Such information can include computer code for execution by the processor 44. The processor 44 manages and controls the operation of the other components within the controller 4000.

Figure 5:
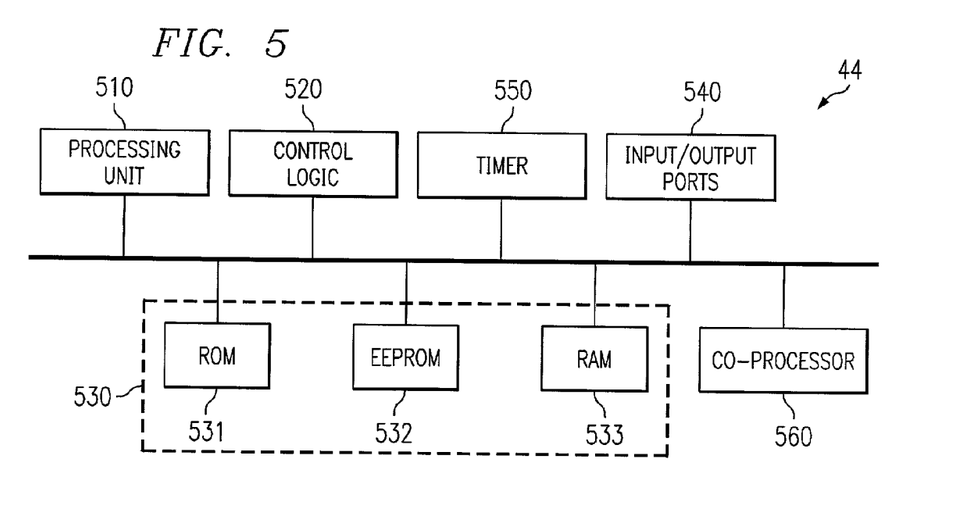
FIG. 5 is a block diagram of a processor for use in the gateway of FIG. 2 or the BTS of FIG. 3.

FIG. 5 is a functional block diagram illustrating an example of a processor 44 for use in the gateway 18 illustrated in FIG. 2, the BTS 300 illustrated in FIG. 3, or the controller 4000 illustrated in FIG. 16. The processor 44 generally includes a processing unit 510, control logic 520, and a memory unit 530. Preferably, the processor 44 also includes a timer 550 and input/output ports 540. The processor 44 can also include a co-processor 560, depending on the microprocessor used in the processing unit 510. The control logic 520 provides, in conjunction with the processing unit 510, the control necessary to handle communications between the memory unit 530 and input/output ports 540. The timer 550 provides a timing reference signal for the processing unit 510 and the control logic 520. The co-processor 560 provides an enhanced ability to perform complex computations in real time.

The memory unit 530 can include different types of memory, such as volatile and non-volatile memory and read-only and programmable memory. For example, as shown in FIG. 5, the memory unit 530 can include read-only memory (ROM) 531, electrically erasable programmable read-only memory (EEPROM) 532, and random-access memory (RAM) 533. Different processors, memory configurations, data structures, and the like can be used to practice the present invention, and the invention is not limited to a specific processor.

When included in a BSC such as the BSC 20 illustrated in FIGS. 1 and 4, or when used in a BTS such as the BTSs 14, 382, and 378 illustrated in FIGS. 1 and 4, the processor 44 illustrated in FIG. 5 can be used to perform an SDU function such as described above.

Although the present invention has been described in connection with specific exemplary embodiments, it should be understood that various changes, substitutions, and alterations can be made to the disclosed embodiments without departing from the spirit and scope of the invention as set forth in the appended claims.

What is claimed is:

1. A method comprising:
   receiving a plurality of sets of signal portions, each set received from a base transceiver station of a plurality of base transceiver stations;
   selecting, by a selection and distribution unit, a signal portion from each set of signal portions to yield a plurality of selected signal portions; and
   combining, by the selection and distribution unit, the selected signal portions to yield a combined signal portion.

2. The method of claim 1, the combining the selected signal portions further comprising:
   adding a plurality of energies of the selected signal portions to yield the combined signal portion.

3. The method of claim 1, the combining the selected signal portions further comprising:
   averaging a plurality of energies of the selected signal portions to yield the combined signal portion.

4. The method of claim 1, the combining the selected signal portions further comprising:
   adding a plurality of waveforms of voltages of the selected signal portions to yield the combined signal portion.

5. The method of claim 1, the combining the selected signal portions further comprising:
   averaging a plurality of waveforms of voltages of the selected signal portions to yield the combined signal portion.

6. The method of claim 1, the combining the selected signal portions further comprising:
   adding and averaging the selected signal portions to yield the combined signal portion.

7. The method of claim 1, the combining the selected signal portions further comprising:
   combining a plurality of symbols to yield the combined signal portion comprising a data bit.

8. The method of claim 1, the receiving the plurality of sets of signal portions further comprising:
   receiving the sets of signal portions at a primary base transceiver station from one or more secondary base transceiver stations, the primary base transceiver station comprising the selection and distribution unit.

9. The method of claim 1, the receiving the plurality of sets of signal portions further comprising:
   receiving the sets of signal portions at a base station controller, the base station controller comprising the selection and distribution unit.

10. One or more non-transitory computer readable media storing one or more instructions, when executed by one or more processors, configured to:
    receive a plurality of sets of signal portions, each set received from a base transceiver station of a plurality of base transceiver stations; and
    select, by a selection and distribution unit, a signal portion from each set of signal portions to yield a plurality of selected signal portions; and
    combine, by the selection and distribution unit, the selected signal portions to yield a combined signal portion.

11. The apparatus of claim 10, the combining the selected signal portions further comprising:
    adding a plurality of energies of the selected signal portions to yield the combined signal portion.

12. The apparatus of claim 10, the combining the selected signal portions further comprising:
    averaging a plurality of energies of the selected signal portions to yield the combined signal portion.

13. The apparatus of claim 10, the combining the selected signal portions further comprising:
    adding a plurality of waveforms of voltages of the selected signal portions to yield the combined signal portion.

14. The apparatus of claim 10, the combining the selected signal portions further comprising:
    averaging a plurality of waveforms of voltages of the selected signal portions to yield the combined signal portion.

15. The apparatus of claim 10, the combining the selected signal portions further comprising:
    adding and averaging the selected signal portions to yield the combined signal portion.

16. The apparatus of claim 10, the combining the selected signal portions further comprising:
    combining a plurality of symbols to yield the combined signal portion comprising a data bit.

17. The apparatus of claim 10, the receiving the plurality of sets of signal portions further comprising:
    receiving the sets of signal portions at a primary base transceiver station from one or more secondary base transceiver stations, the primary base transceiver station comprising the selection and distribution unit.

18. The apparatus of claim 10, the receiving the plurality of sets of signal portions further comprising:
    receiving the sets of signal portions at a base station controller, the base station controller comprising the selection and distribution unit.

* * * * *